(12) United States Patent
Sutherland

(10) Patent No.: US 6,931,784 B1
(45) Date of Patent: Aug. 23, 2005

(54) ADJUSTABLE DEPTH LURE

(76) Inventor: Martin A. Sutherland, Leggett & Kram 1901 S. I St., Tacoma, WA (US) 98405

(*) Notice: Subject to any disclaimer, the term of this patent is extended or adjusted under 35 U.S.C. 154(b) by 0 days.

(21) Appl. No.: 10/917,469

(22) Filed: Aug. 12, 2004

(51) Int. Cl.⁷ .............................................. A01K 85/00
(52) U.S. Cl. ................................................... 43/42.22
(58) Field of Search ........................... 43/42.22, 42.47, 43/42.35; D22/126

(56) References Cited

U.S. PATENT DOCUMENTS

| | | | | |
|---|---|---|---|---|
| 1,220,921 A | * | 3/1917 | Wilson | 43/42.22 |
| 1,232,211 A | * | 7/1917 | Burkman | 43/42.22 |
| 2,495,134 A | * | 1/1950 | Roberts | 43/42.22 |
| 2,578,786 A | * | 12/1951 | Davis | 43/42.22 |
| 2,580,733 A | | 1/1952 | Cowden | |
| 2,598,012 A | * | 5/1952 | Prieur | 43/42.47 |
| 2,703,946 A | | 3/1955 | Davis | |
| 2,775,839 A | | 1/1957 | Kuslich | |
| 2,776,517 A | * | 1/1957 | Borgstrom | 43/42.22 |
| 3,412,500 A | | 11/1968 | Lahtinen | |
| 5,329,721 A | * | 7/1994 | Smith | 43/42.22 |
| 5,561,938 A | * | 10/1996 | Kato et al. | 43/42.22 |
| 5,992,084 A | * | 11/1999 | Kitagawa | 43/42.31 |
| 6,041,539 A | * | 3/2000 | Huang | 43/42.22 |
| 6,079,145 A | * | 6/2000 | Barringer | 43/42.06 |

* cited by examiner

Primary Examiner—Kurt Rowan
(74) Attorney, Agent, or Firm—James F. Leggett

(57) ABSTRACT

An improved means for adjusting the angle of attack, the angle of the plane of the diving lip to the longitudinal axis of a lure, of a diving lip on a fishing lure, having a body with a longitudinal axis, comprised of a retention spring, a pivot pin, and a series of grooves in the face of the lure into which the diving lip seats, so that the angle of attack of the diving lip can be readily changed by pulling the diving lip out of a groove, by compressing the retention spring, moving to another groove and releasing it.

4 Claims, 3 Drawing Sheets

ADJUSTABLE DEPTH LURE

CROSS-REFERENCE TO RELATED APPLICATIONS

NONE

STATEMENT REGARDING FEDERALLY SPONSORED RESEARCH OR DEVELOPMENT

NONE

REFERENCE TO A "SEQUENCE LISTING," A TABLE, OR A COMPUTER PROGRAM LISTING APPENDIX SUBMITTED ON A COMPACT DISC (SEE 37 CFR 1.52(E)(5))

NONE

BACKGROUND OF THE INVENTION (1) Field of the Invention:

This invention relates generally to fishing lures and more particularly to an improved means for setting the depth at which the lure travels through the water when pulled by a fishing line and the ability to manually change said depth in the field.

(2) Description of Related Art Including Information Disclosed Under 37 CFR 1.97 and 1.98:

It has been long known that it is desirable to be able to adjust the depth at which a fishing lure travels through the water when pulled by a fishing line. Initial efforts involved weighting the lure or the line, but said efforts limited the action of the lure and put undue stress on the line with the resultant loss of sensitivity to bites or strikes by fish. In order to try and solve this problem, diving planes where introduced. These are various shapes of protrusions from the lower front of the lure which, when moved through the water, force the lure downward. Early versions of the diving planes were permanently molded or set into the body of the lure, so different water and fishing depths could not be set in the field. Ultimately, means for adjusting the angle of the diving plane to the path of the lure through the water were devised. The adjustable plane of W. R. Cowden, U.S. Pat. No. 2,580,733 is such a means, as is the adjustable mouth of E. A. Prieur, U.S. Pat. No. 2,598,012 and the adjustable scoop of G. W. Davis, U.S. Pat. No. 2,703,946. Some non-adjustable planes have been disclosed which provide action to the lure, but do not pre-determine depth, such as J. S. Kuslich, U.S. Pat. No. 2,775,839 and L. F. Lahtinen, U.S. Pat. No. 3,412,500.

The prior art either required adjustment of the angle of the diving plane with a tool, such as a screw driver or wrench, Prieur and Davis, or did not provide a durable and positive means of setting and holding the angle of the diving plane combined with ease of changing said angle, Cowden.

BRIEF SUMMARY OF THE INVENTION

Accordingly, it is an object of this invention to provide an improved means of adjusting the angle of a diving plane on a fishing lure in the field which does not require additional tools and securely holds the diving plane in the selected position. A further object of this invention is to provide a means to accomplish the first two objectives which is inexpensive to manufacture and simple and durable in design and adaptable to various types of fishing lures. These objects are satisfied by the subject invention comprised of a hollow lure, having a front and rear with a longitudinal axis, formed in two mirrored halves with partition walls therein so located as to form four chambers plus a chamber for the adjustable diving plane assembly, which has a recess formed at its innermost end to hold a cylinder around which a loop at one end of a stainless steel spring is threaded when the two halves of the lure are joined. The end of the stainless steel spring opposite to the loop is fixedly attached to the molded end of the diving plane adjacent to the edge of the spoon shaped face which edge engages one of the pre-molded grooves in the exterior face of the chamber which contains the adjustable diving plane assembly, so that the diving plane is held in place by the tension of the stainless steel spring, yet can be manually withdrawn from the groove by overcoming the tension of the stainless steel spring and relocated the edge to another groove to accommodate different fishing conditions.

The invention, both as to its composition and method of operation, together with further objectives and advantages thereof, may best be understood by reference to the following description taken in connection with the accompanying drawings.

DETAILED DESCRIPTION OF THE INVENTION

Figure 1:
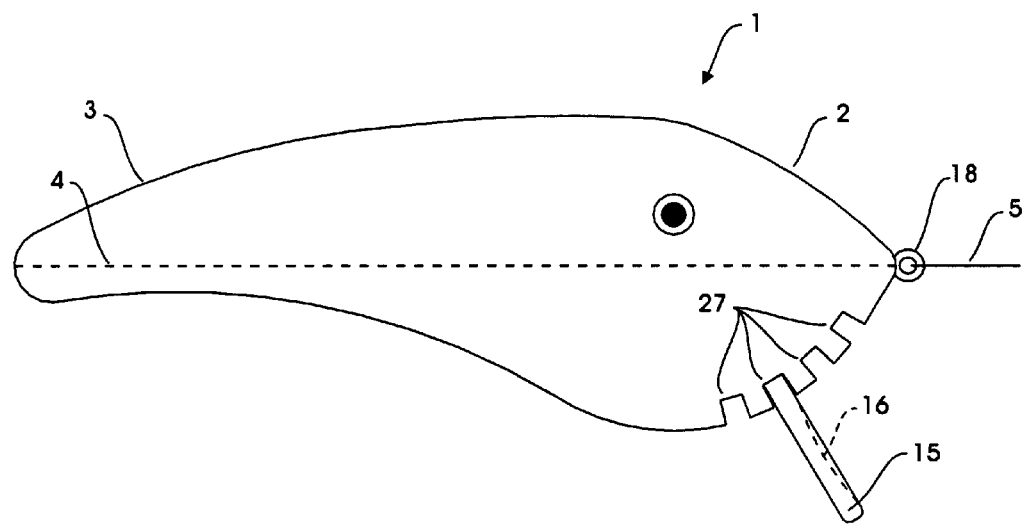
FIG. 1 is a sectional elevational view of one side of the fishing lure.
Figure 2:
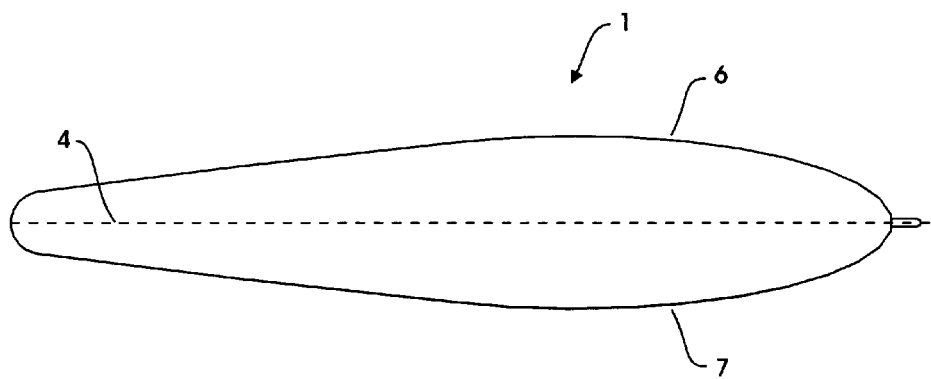
FIG. 2 is a sectional elevational view of the top of the fishing lure.

FIG. 1 shows the right side of a fishing lure (1) having a front (2) and a rear (3) with its longitudinal axis (4) shown, provided with pre-molded grooves (27) and a fastening means (18) at it front (2) to attach the fishing line (5). FIG. 2 shows the fishing lure (1) from above illustrating the left half (6) and the right half (7) and the longitudinal axis (4) along which the sides are joined, both sides interiors being mirror images of the other so that when mated they form 5 hollow chambers within the fishing lure.

Figure 3:
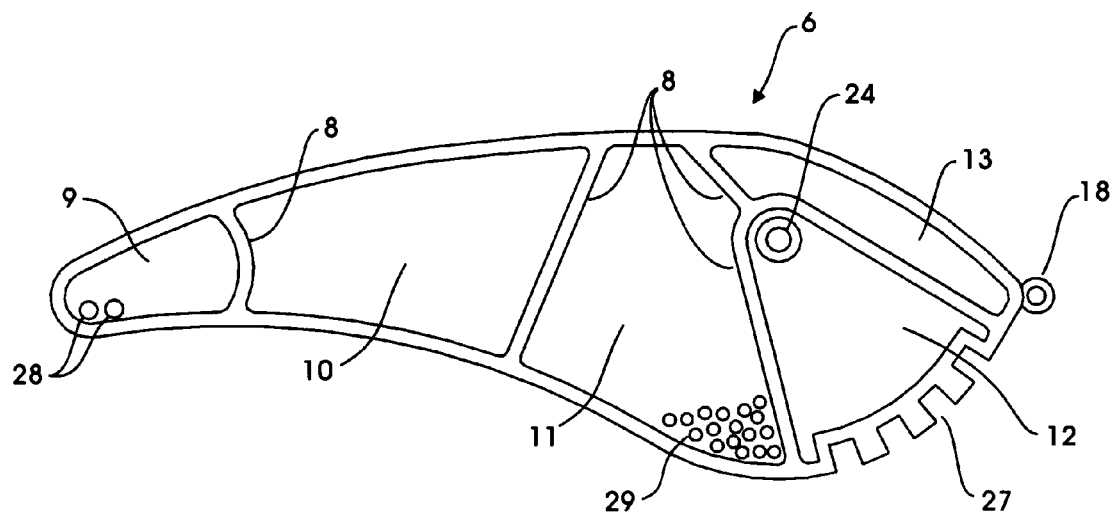
FIG. 3 is a sectional elevational view of the inside of the left mirror face of the fishing lure.

FIG. 3 shows the inside of the left half (6) of the fishing lure (1) with the partition walls (8) extending from its convex side to the point of joinder with the right half (7) and its partition walls (8) so that, when the two halves of the fishing lure (1) are joined along the longitudinal axis (4), five hollow chambers are formed inside the fishing lure (1), an aft chamber (9), a second chamber (10), a weight chamber (11) a forward chamber (13) and an adjustable diving plane chamber (12), into which is formed a recess (24) at its inner most end (25) to accommodate the cylinder (23) which restrains the stainless steel spring (21) and into which exterior surface are formed regularly spaced pre-molded grooves (27) into which is engaged the edge (26) of the spoon shaped face (16), being of general semi-circular shape (17), of the diving plane (15).

Figure 4:
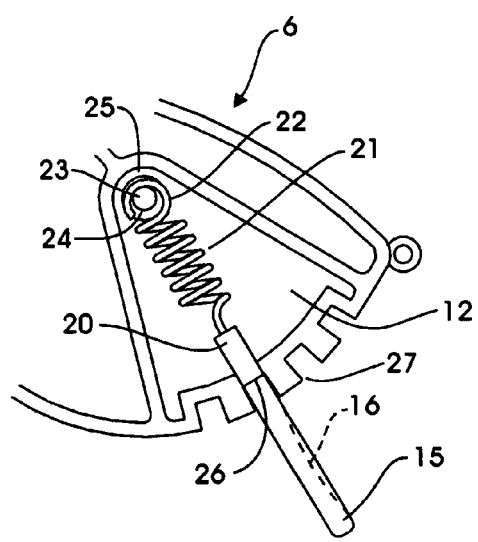
FIG. 4 is a side elevation of the adjustable diving plane assembly located in its chamber on the left mirror face of the fishing lure.
Figure 5:
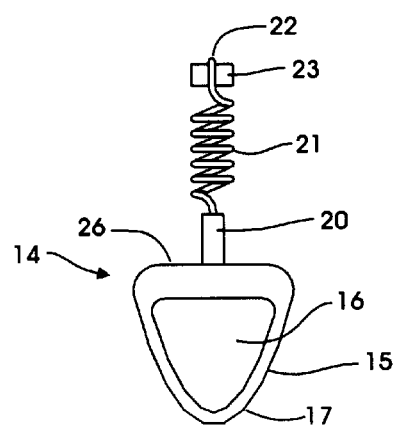
FIG. 5 is a front elevational view of the adjustable diving plane assembly outside of the fishing lure.

With specific reference to FIGS. 4 and 5, the detail of the adjustable diving plane assembly (14) is shown, comprised of a loop (22) at one end of a stainless steel spring (21) through which is threaded a cylinder (23) whose ends are held in mating recesses (24) located at the innermost end (25) of the adjustable diving plane chamber (12) and said stainless steel spring extends through the length of the chamber (12) and is molded into the molded end (20) of the diving plane (15), which molded end (20) flares to form an edge (26) on either side of the molded end (20) of the spoon shaped face (16) of the diving plane (15) of such size and dimension so as to removably engage a pre-molded groove (27) on the exterior surface of the adjustable diving plane chamber (12).

Figure 6:
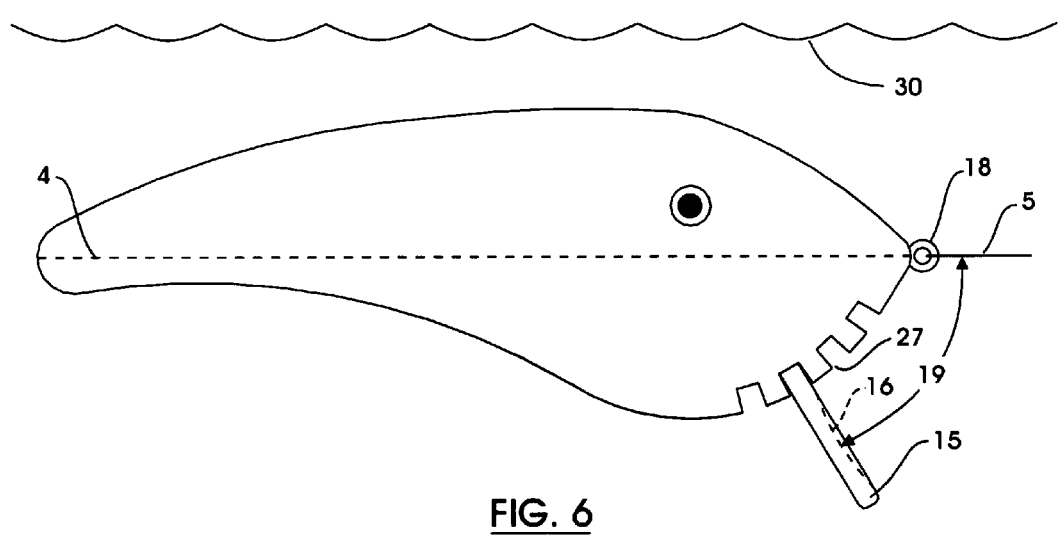
FIG. 6 is a side dimensional view of the invention in use below the surface of the water.

FIG. 6 illustrates the use of the invention to control the depth of the travel of the fishing lure (1) below the surface of the water (30) by the down force applied upon the spoon shaped face (16) of the diving plane (15) determined by the angle (19) between the spoon shaped face (16) and the longitudinal axis (4) of the fishing lure (1) and the speed of the fishing lure (1) through the water being pulled by the fishing line (5).

FIG. 3 also illustrates alternative embodiments of the invention in which the aft chamber (6) is equipped with noise balls (28) which emanate noise when the lure is moved through the water and a weight means (29) being contained in the weight chamber (11) so as to provide the lure with neutral buoyancy.

The foregoing disclosure and description of the invention are illustrative and explanatory thereof and, it will be understood by those skilled in the art, that various changes in the size, shape and materials, as well as in the details of the illustrated construction, may be made within the scope of the appended claims without departing from the scope or spirit of the invention.

I claim:

1. An improved means for changing the depth of a fishing lure, having a front, a center, a rear and a longitudinal axis, travels through the water when pulled by a fishing line, comprised of:
    a hollow lure body composed of two halves joined along the longitudinal axis of the lure, having four partition walls at varied angles to the longitudinal axis, formed in each halve, so that when the two halves are joined together, four separate sealed chambers are formed and another chamber is formed, having an innermost end furthest from the front of the fishing lure, which retains an adjustable diving plane assembly means, and having a plurality of pre-molded grooves on each halve of the lure body, comprised of:
    a diving plane, having a spoon shaped face of semi-circular shape, protruding from the front of the fishing lure below the longitudinal axis of the fishing lure below a fastening means to the fishing line, which pulls the fishing lure through the water, so that the spoon shaped face engages the water as the fishing lure is pulled there through and pulls the fishing lure downward in the water to a depth determined by the angle of the diving lip to the longitudinal axis of the fishing lure and the speed at which the lure is traveling through the water;
    an adjustment means for fixedly setting the angle of the diving lip to the longitudinal axis of the fishing lure comprised of molding one end of the diving plane to fixedly attach to one end of a stainless steel spring rated so that it can be manually stretched, while the other end of the stainless steel spring is formed into a loop oriented 90 degrees, perpendicular, to the spoon shaped face of the diving plane, through which is threaded a cylinder of rigid material which rests within a recess at the innermost end of the another chamber, which retains the adjustable diving plane assembly means, while an edge of the spoon shaped face of the diving plane engages one of many pre-molded grooves into each side of the lure body at regularly spaced intervals below the fastening means to the fishing line, being restrained in said groove by the tension of the stainless steel spring, so that the angle of the diving plane to the longitudinal axis of the lure can be changed by pulling the diving plane to another the stainless steel spring and move the edge of the spoon shaped face of the diving plane from one of the pre-molded grooves to another pre-molded groove and releasing the pull on the diving plane so that an stainless steel spring restrains the edge of the spoon shaped face of the diving plane within said pre-molded groove in the lure body.

2. An improved means for changing the depth of a fishing lure as recited in claim 1 wherein the stainless steel spring of claim 1 has a rating of 15–20 foot pounds.

3. An improved means for changing the depth of a fishing lure as recited in claim 1 wherein the hollow lure body is composed of two halves joined along the longitudinal axis of the lure, having four partition walls at varied angles to the longitudinal axis, formed therein, so that when the two halves are joined together, four separate sealed chambers are formed and another chamber is formed which retains an adjustable diving plane assembly means, wherein the aft most sealed chamber contains a noise creating means comprised of balls which are free to move within the aft most chamber with the movement of the fishing lure.

4. An improved means for changing the depth of a fishing lure as recited in claim 1 wherein the hollow lure body is composed of two halves joined along the longitudinal axis of the lure, having four partition walls at varied angles to the longitudinal axis, formed therein, so that when the two halves are joined together, four separate sealed chambers are formed and another chamber is formed which retains an adjustable diving plane assembly means, wherein the separate sealed chamber, immediately aft of the chamber retaining the adjustable diving plane assembly means, contains weight means so the lure has neutral buoyancy.

* * * * *